(12) United States Patent
Snow

(10) Patent No.: US 7,735,845 B2
(45) Date of Patent: Jun. 15, 2010

(54) REAR STEER LAWN MOWING VEHICLE WITH FRONT STEERING MEANS

(76) Inventor: Robert K. Snow, 3885 Old Hollow Rd., Kernersville, NC (US) 27284

( * ) Notice: Subject to any disclaimer, the term of this patent is extended or adjusted under 35 U.S.C. 154(b) by 141 days.

(21) Appl. No.: 12/221,251

(22) Filed: Aug. 1, 2008

(65) Prior Publication Data

US 2010/0025949 A1 Feb. 4, 2010

(51) Int. Cl.
*B62D 7/16* (2006.01)
(52) U.S. Cl. .................................................. 280/93.51
(58) Field of Classification Search ............ 280/93.51, 280/93.513; 180/6.24, 6.32, 6.38, 6.4; 56/14.7
See application file for complete search history.

(56) References Cited

U.S. PATENT DOCUMENTS

| | | | | |
|---|---|---|---|---|
| 3,479,050 A | * | 11/1969 | Bloise | 280/124.113 |
| 3,768,825 A | * | 10/1973 | Magnusson | 280/124.109 |
| 4,518,170 A | * | 5/1985 | Musgrove | 280/93.513 |
| 4,580,462 A | * | 4/1986 | Rehlander | 74/497 |
| 4,749,205 A | * | 6/1988 | Takahashi et al. | 280/124.116 |
| 6,675,925 B2 | * | 1/2004 | Takahashi et al. | 180/266 |
| 7,237,629 B1 | * | 7/2007 | Bland et al. | 180/6.24 |

* cited by examiner

*Primary Examiner*—Faye M. Fleming
(74) *Attorney, Agent, or Firm*—Olive Law Group, PLLC

(57) ABSTRACT

A rear steer mower having a front steering assembly is provided. The front steering assembly includes a steering wheel, a steering shaft, a pair of toed out negatively castered front wheels and a linking element configured to receive rotational input from the steering wheel to the pair of front wheels.

12 Claims, 2 Drawing Sheets

REAR STEER LAWN MOWING VEHICLE WITH FRONT STEERING MEANS

BACKGROUND OF THE INVENTION (1) Field of the Invention

The present invention relates generally to riding mowers, and in particular, to a hydrostatically controlled rear steer mower with a front steering mechanism.

(2) Description of the Prior Art

Lawnmowers are well known in the art and have been used for decades to maintain a lawn's appearance. In the prior art, the lawnmower design has typically been of the form of a riding mower that is propelled by the use of a gasoline or diesel engine. A mowing deck is located beneath the mower, and in some circumstances in front or behind of mower. The mowing deck is usually powered by the same gasoline or diesel mower that propels the vehicle. The mowing deck may contain a series of pulleys connected with mowing blades that operate in a rotational pattern to cut a lawn.

Many problems have plagued the riding lawnmower. In the past, riding lawnmowers were incapable of cornering in an acceptable turn radius. In order to correct this problem, the prior art implemented a rear steer mowing system, commonly called a zero turn mower. This rear steer mechanism made each rear wheel independently controllable by the operator and turning was facilitated by slowing the inner turn radius wheel while accelerating the outer turn radius wheel. However, these zero turn mowers were deficient in the regards that they were susceptible to loss of tire grip while cornering and on steep terrain. When the rider was operating the vehicle on a steep terrain, the higher elevated tire would lose contact with the terrain surface and thereby cause the mower to sway out of control from the operator. This created a dangerous and inefficient method of mowing.

Thus, there remains a need for a new and improved hydrostatically controlled rear steer mower that is capable of maintaining tire grip while traversing rough, uneven or highly sloped terrain.

SUMMARY OF THE INVENTION

The present invention is directed to a rear steer mower having a front steering assembly. The front steering assembly includes a steering wheel configured for receiving rotational input from a rider and a steering shaft connected with the steering wheel and configured to receive rotational input from the steering wheel. A steering hub is connected with the steering shaft and configured to receive a pair of linking elements for transferring rotational input. A first spindle hub is located at a first predetermined distance from the steering hub and attached with a first pivotally movable front wheel, wherein the wheel is pivotally movable in a horizontal plane relative to the mower. A second spindle hub is located at a second predetermined distance from the steering hub and attached with a second pivotally movable front wheel, wherein the second pivotally movable wheel is movable in a horizontal plane relative to the mower. A first linking element extends from the first spindle hub to the steering hub, and a second linking element extends from the second spindle hub to the steering hub. Rotation of the steering wheel imparts rotational movement to the steering hub through the steering shaft, and the linking element imparts rotational movement to the first and second spindle hubs, thereby rotating the front tires of the rear steer mower in response to rotational input from the steering wheel.

In another embodiment, the steering wheel includes a slip joint connection and is selectively engageable.

In another embodiment, the front tires are negatively castered.

In another embodiment, the steering hub, first spindle hub, and second spindle hub are geared and the first linking element and the second linking element are chains, and the steering hub, first spindle hub, and second spindle hub are configured to receive the chain of the first linking element and second linking element, thereby forming a chain driven front end assembly.

In another embodiment, the steering hub, first spindle hub, and second spindle hub are pulleys and the first linking element and the second linking element are belts, and the steering hub, first spindle hub, and second spindle hub are configured to receive the belts of the first linking element and second linking element, thereby forming a belt driven front end assembly.

In another embodiment, the first front wheel and second front wheel are toed out in a horizontal plane relative to the mower.

In another embodiment, the steering shaft further includes universal joints.

In another embodiment, the mower includes a support for maintaining the front steering assembly in an upright position.

These and other aspects of the present invention will become apparent to those skilled in the art after a reading of the following description of the preferred embodiment when considered with the drawings.

DESCRIPTION OF THE PREFERRED EMBODIMENTS

Figure 1:
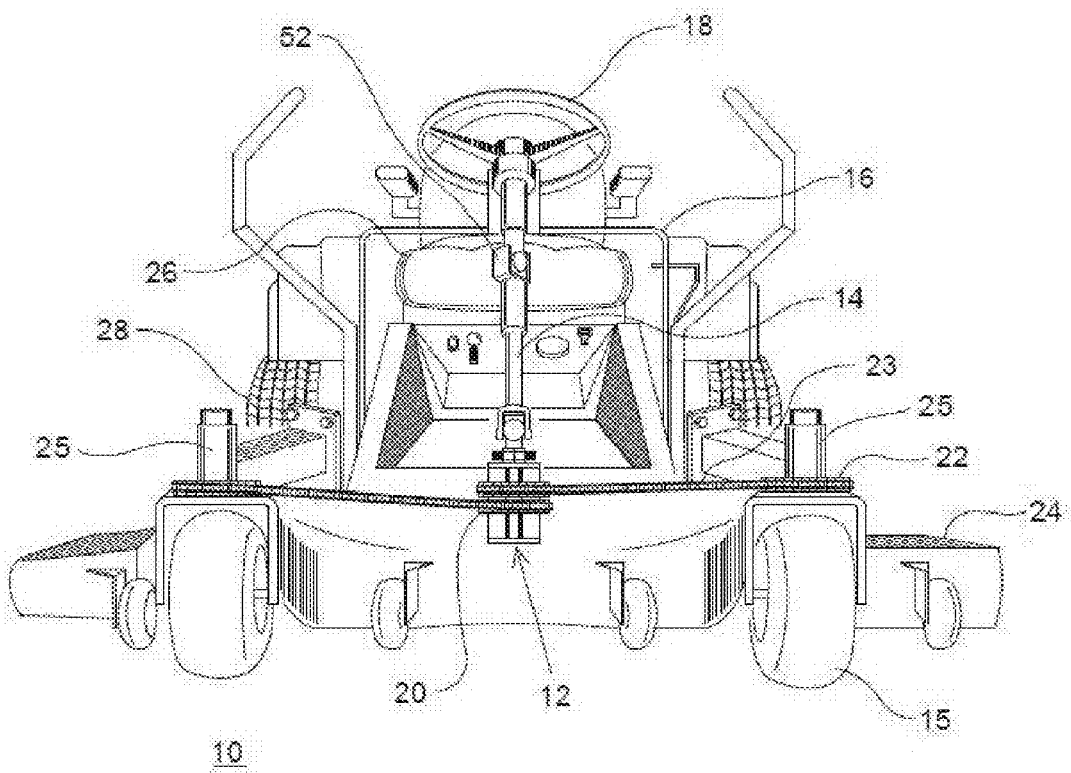
FIG. 1 is a side view of a mower constructed according to the prior art.
Figure 2:
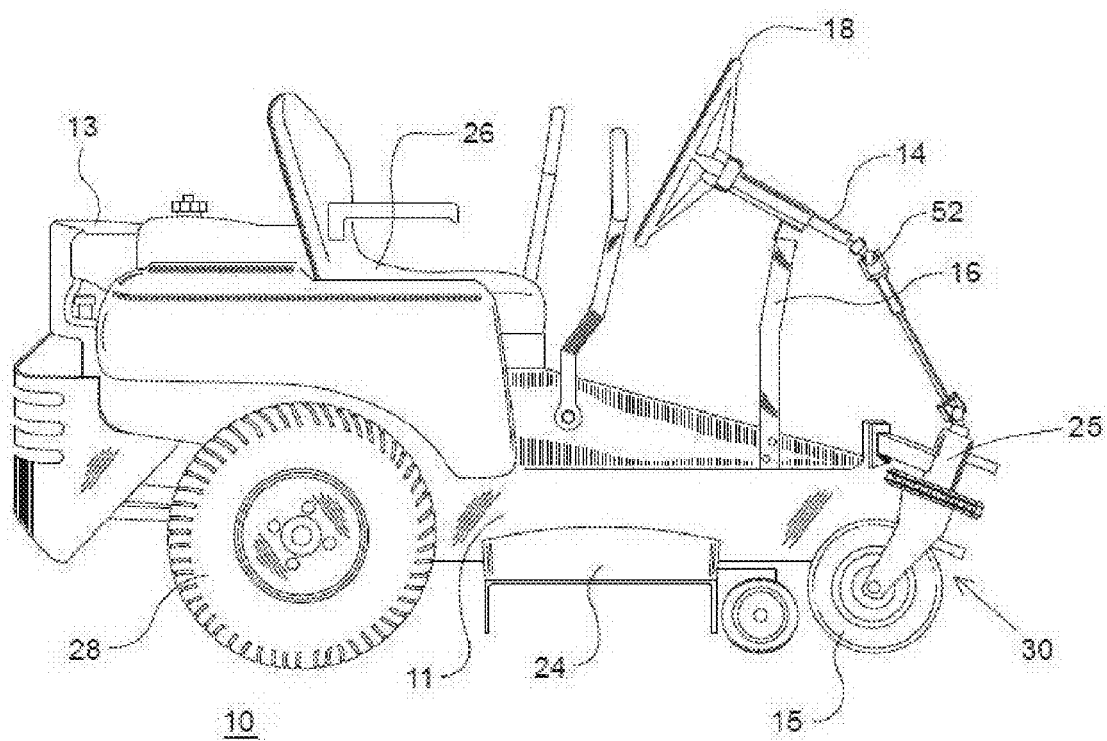
FIG. 2 is a side view of a mower constructed according to the present invention including the negatively castered pair of front wheels.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms. Referring now to the drawings in general and FIG. 1 in particular, it will be understood that the illustrations are for the purpose of describing an embodiment of the invention and are not intended to limit the invention thereto. As best seen in FIG. 1, though also seen effectively in FIG. 2 and FIG. 3, an improved vehicle 10 is shown according to the present invention. The vehicle 10 includes a steering assembly generally designated 12, which includes a steering shaft 14, steering support 16, steering wheel 18, and steering hub 20 for rotating the steering assembly 10. The steering shaft 14 is support by the steering support 16. The steering shaft 14 is also connected with the steering wheel 18 for receiving driver input. The steering shaft 14 may include a series of universal joints 52 for facilitating turning of the steering shaft 14. The vehicle 10 includes a seat 26, a mowing deck 24 and a hydrostatically operated rear axle 28. As shown in FIG. 2, the vehicle also includes an engine 13, a chassis 11 and a pair of front wheels 15. The steering wheel may be selectively engageable by the use of a slip joint, clutch or similar device.

As best shown in FIG. 2, the vehicle 10 may contain a castered front end assembly, generally designated 30.

Figure 3:
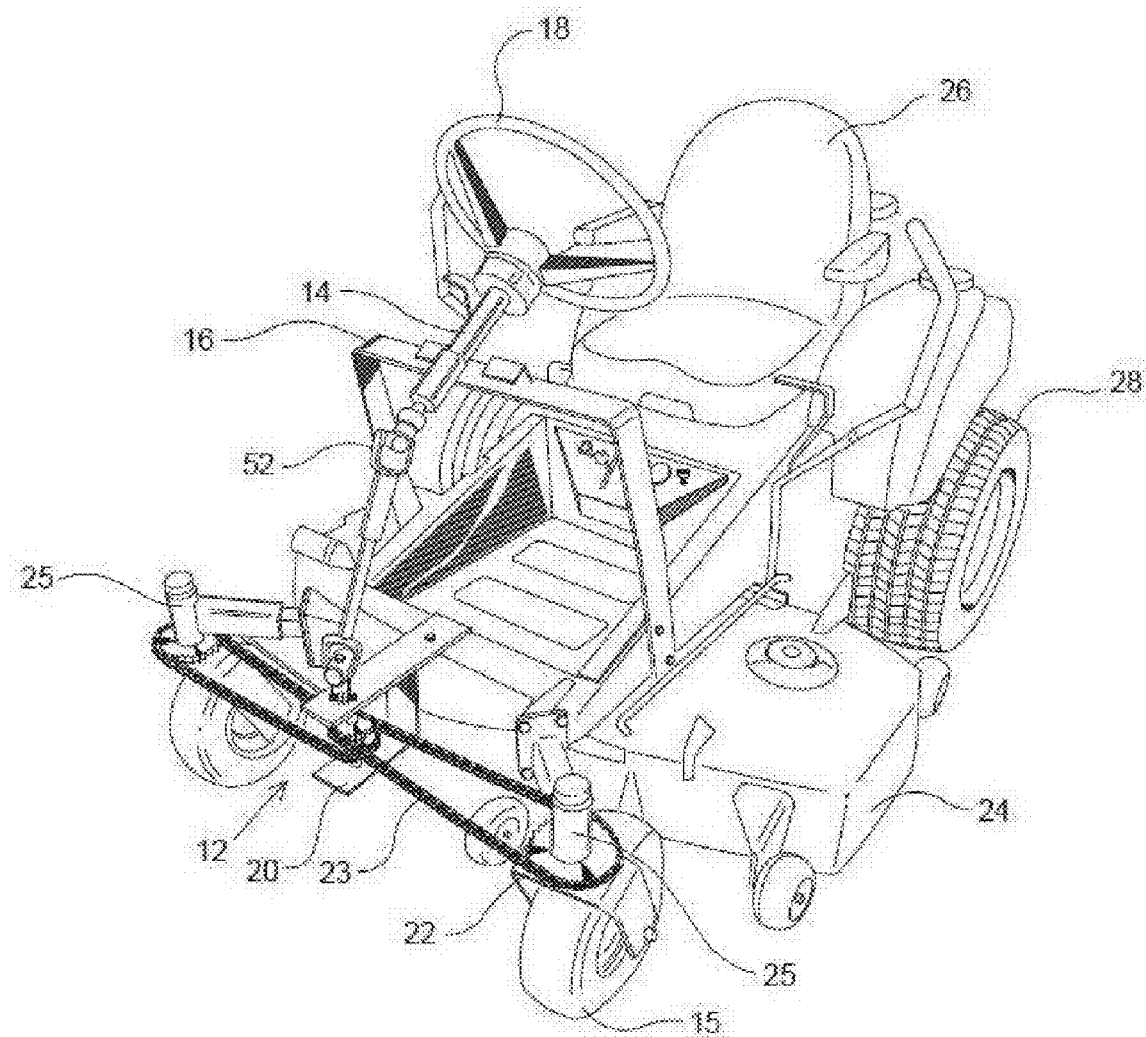
FIG. 3 is a perspective view of a mower constructed according to the present invention.

As best seen in FIG. 3, but also seen effectively in FIG. 1 and FIG. 2, the steering assembly generally designated 12 contains a steering hub 20. This steering assembly includes a series of gears 22 which are axially aligned with the steering axis of the steering shaft 14 and the pair of front wheels 15. This steering hub 20 is connected with a chain 23 that is linked within the gears 22 of the steering shaft 14 and the pair of front wheels 15. A pair of spindle hubs 25 are also provided that are coaxially aligned with the pivot point of each of the pair of front wheels 15. The gears 22 may be positioned such that the front wheels 15 are toed outward from each other. Alternatively, a series of pulleys and belts may be used in lieu of the gear and chain assembly. The pair of spindle hubs are configured such that the front wheels 15 may be rotated a full 360 degrees of motion.

In operation, the operator maneuvers the vehicle by engaging the hydrostatically or by other means controlled axle. If the operator desires, they may aid the vehicle in turning by using the selectively engageable steering wheel to rotate the pair of front wheels in the desired location. In the preferred embodiment, the front tires are toed out by the rotational transmission means assembly and are therefore able to corner more effectively. In embodiments with the castered front end assembly 30, when the operator rotates the wheel assembly, the outer turn radius wheel will move diagonally upwards and the inner turn radius wheel will move diagonally downward. In cases on extreme inclines, this will aid the user in maintaining vehicle balance and stability.

I claim:

1. A rear steer mower having a front steering assembly, wherein the front steering assembly comprises:
   a steering wheel configured for receiving rotational input from a rider;
   a steering shaft connected with the steering wheel and configured to receive rotational input from the steering wheel;
   a steering hub connected with the steering shaft and configured to receive a pair of linking elements for transferring rotational input;
   a first spindle hub located at a first predetermined distance from the steering hub and attached with a first pivotally movable front wheel, wherein the wheel is pivotally movable in a horizontal plane relative to the mower;
   a second spindle hub located at a second predetermined distance from the steering hub and attached with a second pivotally movable front wheel, wherein the second pivotally movable wheel is movable in a horizontal plane relative to the mower;
   a first linking element extending from the first spindle hub to the steering hub; and
   a second linking element extending from the second spindle hub to the steering hub, whereby rotation of the steering wheel imparts rotational movement to the steering hub through the steering shaft, and the linking element imparts rotational movement to the first and second spindle hubs, thereby rotating the front tires of the rear steer mower in response to rotational input from the steering wheel, wherein the first and second spindle hubs are configured to allow full 360 degree rotation.

2. The device according to claim 1, wherein the front tires are castered.

3. The device according to claim 1, wherein the steering hub, first spindle hub, and second spindle hub are geared and the first linking element and the second linking element are chains, and the steering hub is configured to receive the chain of the first linking element and the chain of the second linking element, and the first spindle hub is configured to receive the chain of the first linking element and the second spindle hub is configured to receive the chain of the second linking element, thereby forming a chain driven front end assembly.

4. The device according to claim 1, wherein the first front wheel and second front wheel are toed out in a horizontal plane relative to the mower.

5. The device according to claim 1, wherein the steering shaft further includes universal joints.

6. The device according to claim 1, further including a support for maintaining the front steering assembly in an upright position.

7. A mower comprising:
   a hydrostatically controlled rear steer mower; and
   a front steering assembly connected with the mower and configured to provide front steering for the mower including:
      a steering wheel configured for receiving rotational input from a rider;
      a steering shaft connected with the steering wheel and configured to receive rotational input from the steering wheel;
      a steering hub connected with the steering shaft and configured to receive a pair of linking elements for transferring rotational input;
      a first spindle hub located at a first predetermined distance from the steering hub and attached with a first pivotally movable front wheel, wherein the wheel is pivotally movable in a horizontal plane relative to the mower;
      a second spindle hub located at a second predetermined distance from the steering hub and attached with a second pivotally movable front wheel, wherein the second pivotally movable wheel is movable in a horizontal plane relative to the mower;
      a first linking element extending from the first spindle hub to the steering hub; and
      a second linking element extending from the second spindle hub to the steering hub, whereby rotation of the steering wheel imparts rotational movement to the steering hub through the steering shaft, and the linking element imparts rotational movement to the first and second spindle hubs, thereby rotating the front tires of the rear steer mower in response to rotational input from the steering wheel, wherein the first and second spindle hubs are configured to rotate 360 degrees.

8. The device according to claim 7, wherein the front tires are negatively castered.

9. The device according to claim 7, wherein the steering hub, first spindle hub, and second spindle hub are geared and the first linking element and the second linking element are chains, and the steering hub is configured to receive the chain of the first linking element and the chain of the second linking element, and the first spindle hub is configured to receive the chain of the first linking element and the second spindle hub is configured to receive the chain of the second linking element, thereby forming a chain driven front end assembly.

10. The device according to claim 7, wherein the first front wheel and second front wheel are toed out in a horizontal plane relative to the mower.

11. The device according to claim 7, wherein the steering shaft further includes universal joints.

12. The device according to claim 7, further including a support for maintaining the front steering assembly in an upright position.

* * * * *

UNITED STATES PATENT AND TRADEMARK OFFICE
CERTIFICATE OF CORRECTION

PATENT NO. : 7,735,845 B2  Page 1 of 1
APPLICATION NO. : 12/221251
DATED : June 15, 2010
INVENTOR(S) : Robert W. Snow It is certified that error appears in the above-identified patent and that said Letters Patent is hereby corrected as shown below:

On the Title Page, Item (76), Inventor section, please delete "Robert K. Snow" and replace with --Robert W. Snow--

Signed and Sealed this

Twenty-fourth Day of August, 2010

David J. Kappos
*Director of the United States Patent and Trademark Office*